United States Patent
Howell et al.

(10) Patent No.: US 12,179,728 B2
(45) Date of Patent: Dec. 31, 2024

(54) BRAKING SYSTEM

(71) Applicant: AIRBUS OPERATIONS LIMITED, Bristol (GB)

(72) Inventors: George Howell, Bristol (GB); Laia Navarro, Bristol (GB); Florian Becher, Bristol (GB); Steve David, Bristol (GB); Joy Au, Bristol (GB); Benjamin Kerr, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 159 days.

(21) Appl. No.: 17/511,373

(22) Filed: Oct. 26, 2021

(65) Prior Publication Data
US 2022/0194335 A1 Jun. 23, 2022

(30) Foreign Application Priority Data
Dec. 21, 2020 (GB) .................................. 2020278

(51) Int. Cl.
*B60T 8/17* (2006.01)
*B60T 17/22* (2006.01)

(52) U.S. Cl.
CPC ............ *B60T 8/1703* (2013.01); *B60T 17/22* (2013.01); *B60T 2270/414* (2013.01)

(58) Field of Classification Search
CPC .. B60T 8/1703; B60T 2270/402; B60T 7/042; B60T 8/325; B60T 8/885; B60T 8/4077; B60T 8/4081; B60T 13/686; B60T 13/662; B60T 13/741; B60T 13/745; B60T 17/22; B60T 2270/413; B60T 2270/414; B64C 25/42; B64C 25/423; B64C 25/44
See application file for complete search history.

(56) References Cited

U.S. PATENT DOCUMENTS

| | | | |
|---|---|---|---|
| 5,397,173 A | 3/1995 | Bourguet | |
| 5,456,523 A | 10/1995 | Boehringer | |
| 5,568,962 A * | 10/1996 | Enomoto | B60L 3/0046 303/3 |
| 6,820,946 B2 | 11/2004 | Salamat et al. | |
| 8,733,847 B2 | 5/2014 | Thibault et al. | |

(Continued)

FOREIGN PATENT DOCUMENTS

| | | | |
|---|---|---|---|
| CN | 107719651 | 2/2018 | |
| CN | 111137262 | 5/2020 | |
| DE | 19939200 A1 * | 12/2000 | B60T 17/02 |

OTHER PUBLICATIONS

European Search Report cited in EP 21204059.6, mailed Apr. 4, 2022, 10 pages.

*Primary Examiner* — Pamela Rodriguez (74) *Attorney, Agent, or Firm* — Nixon & Vanderhye P.C.

(57) ABSTRACT

An aircraft braking system for an aircraft, the aircraft including first and second brakes, and first and second energy distribution systems for delivering energy to the first and second brakes to operate the respective first and second brakes. The aircraft braking system is switchable between: a first configuration, in which the first energy distribution system is coupled to the first brake and is isolated from the second brake, and the second energy distribution system is coupled to the second brake and is isolated from the first brake; and a second configuration, in which the first energy distribution system is coupled to both the first and second brakes.

12 Claims, 2 Drawing Sheets

(56) References Cited

U.S. PATENT DOCUMENTS

| | | | |
|---|---|---|---|
| 9,656,641 B2 | 5/2017 | Griffith et al. | |
| 2002/0057012 A1* | 5/2002 | Bourguet | B60T 17/18 303/113.1 |
| 2003/0030322 A1* | 2/2003 | Yokoyama | B60T 8/3255 303/122.04 |
| 2003/0125847 A1* | 7/2003 | Tinskey | B60T 8/1755 701/1 |
| 2003/0233179 A1* | 12/2003 | Matsubara | B62D 5/001 701/70 |
| 2004/0195909 A1* | 10/2004 | Hamzeh | B60T 8/00 303/10 |
| 2004/0207253 A1* | 10/2004 | Nakayasu | B60T 8/405 303/113.5 |
| 2005/0190524 A1* | 9/2005 | Yamamoto | B60K 23/08 361/139 |
| 2007/0222284 A1* | 9/2007 | Matsubara | B60T 17/18 303/122.04 |
| 2007/0252428 A1* | 11/2007 | Okano | B60T 8/4081 303/113.1 |
| 2008/0084107 A1* | 4/2008 | Yanai | B60T 1/10 701/70 |
| 2011/0187180 A1 | 8/2011 | Frank | |
| 2013/0082514 A1* | 4/2013 | Murakami | B60T 13/686 303/14 |
| 2014/0136026 A1* | 5/2014 | Ros Perez | B64C 25/426 701/3 |
| 2014/0303813 A1* | 10/2014 | Ihns | G09G 5/02 701/3 |
| 2015/0151728 A1 | 6/2015 | Iordanidis et al. | |
| 2015/0274143 A1* | 10/2015 | Miyazaki | B60T 8/348 303/9.61 |
| 2016/0046270 A1 | 2/2016 | Knight | |
| 2016/0347290 A1 | 12/2016 | Jiao et al. | |
| 2016/0347298 A1* | 12/2016 | Jung | B60T 13/166 |
| 2017/0282877 A1* | 10/2017 | Besier | B60T 8/885 |
| 2019/0031165 A1* | 1/2019 | Besier | B60T 8/92 |
| 2019/0308601 A1* | 10/2019 | Maj | B60T 13/161 |
| 2019/0344769 A1* | 11/2019 | Zimmermann | B60T 8/326 |
| 2020/0198611 A1 | 6/2020 | Witte | B60T 13/662 |
| 2020/0276963 A1* | 9/2020 | Zimmermann | B60T 13/686 |
| 2020/0307538 A1* | 10/2020 | Ganzel | B60T 8/4081 |
| 2021/0009102 A1* | 1/2021 | Nakayama | B60T 8/885 |
| 2021/0053540 A1* | 2/2021 | Besier | B60T 8/326 |

* cited by examiner

BRAKING SYSTEM

RELATED APPLICATION

This application claims priority to and incorporates by reference in its entirety to United Kingdom patent application GB 2020278-4, filed Dec. 21, 2020.

TECHNICAL FIELD

The present invention relates to systems for actuating aircraft components, and specifically braking systems for aircraft.

BACKGROUND

It is known to equip aircraft having brakes with a primary braking system and a backup braking system, wherein the backup braking system can be used to operate at least some of the brakes of the aircraft in the event of a failure of the primary braking system. The primary and backup systems may be separated by valves.

There is a desire to improve the reliability of such backup braking systems, for example to improve the management of zonal failures or common cause events, where the nominally independent primary and backup systems share a common physical installation or upstream point, such as a power supply, which is susceptible to damage.

Embodiments of the invention described herein address these problems by providing an aircraft braking system which is more resilient to zonal failures and common-cause events without the need for additional backup systems, thereby improving an ease of installation and reducing weight and costs.

SUMMARY

A first aspect of the present invention provides an aircraft braking system for an aircraft, the aircraft comprising first and second brakes, the aircraft braking system comprising first and second energy distribution systems for delivering energy to the first and second brakes to operate the respective first and second brakes, wherein the aircraft braking system is switchable between: a first configuration, in which the first energy distribution system is coupled to the first brake and is isolated from the second brake, and the second energy distribution system is coupled to the second brake and is isolated from the first brake; and a second configuration, in which the first energy distribution system is coupled to both the first and second brakes.

In this way, the aircraft braking system may be configurable in the second configuration in the event of a reduction or loss of energy in the second energy distribution system when the aircraft braking system is configured in the first configuration, such as in the event of a failure of a part of the second energy distribution system and/or components associated therewith. This may provide improved redundancy without requiring additional backup systems. Optionally, the aircraft comprises first and second wheels, and the first and second brakes are for braking the respective first and second wheels. In this way, configuring the aircraft braking system in the second mode may provide improved symmetry of braking of the first and second wheels, thereby to improve safety and braking performance, and to reduce a demand on steering systems and other heading control systems of the aircraft, such as rudders.

Optionally, in the second configuration, the second energy distribution system is isolated from the first brake. Alternatively, in the second configuration, the second energy distribution system is coupled to both the first and second brakes. This may enable the second energy distribution system to provide energy to both the first and second brakes in the event of a failure of a part of the first energy distribution system.

Optionally, when the braking system is in the second configuration, the first energy distribution system is coupled to the second brake via at least a part of the second energy distribution system. That is, when the braking system is in the second configuration, the first energy distribution system is coupled to the second energy distribution system.

Optionally, the first and second energy distribution systems are configured to deliver energy to the respective first and second brakes to operate the respective first and second brakes during a landing or taxiing manoeuvre, or during flight of the aircraft, such as during a pre-landing braking system test.

Optionally, the aircraft braking system is a hydraulic aircraft braking system. For example, the first and second energy distribution systems may be hydraulic energy distribution systems. Optionally, the aircraft braking system is an electric aircraft braking system. For example, the first and second energy distribution systems may be electric energy distribution systems.

Optionally, the aircraft comprises first and second sets of brakes, wherein the first set of brakes comprises the first brake and the second set of brakes comprises the second brake. Optionally, in the first configuration, the first and second energy distribution systems are coupled to the respective first and second sets of brakes. For example, each of the first and second energy distribution systems may be configured to deliver energy to a respective half of the brakes of the aircraft when the aircraft braking system is in the first configuration. Providing first and second energy distribution systems allows the first energy distribution system to continue to operate each of the first and second brakes, or first and second sets of brakes, in the event of a reduction or loss of energy in the second energy distribution system when the braking system is configured in the first configuration, such as in the event of a failure of the second energy distribution system and/or components associated therewith. That is, the aircraft braking system has improved redundancy. For example, in the second configuration, the first energy distribution system may be able to provide sufficient energy to operate the or each brake associated with second energy distribution system in the event of a failure of the second energy distribution system. That is, there may be little or no loss of performance of the aircraft braking system in the event of a failure of the second energy distribution system.

Optionally, the aircraft braking system comprises more than two energy distribution systems, and, when the aircraft braking system is in the first configuration, each of the energy distribution systems is coupled to a respective brake, or set of brakes, associated with that energy distribution system, and is isolated from brake(s) associated with others of the energy distribution systems. Optionally, when the aircraft braking system is in the second configuration, any one of the energy distribution systems is coupled to, such as configured to deliver energy to, a brake or set of brakes associated with one or more of the other energy distribution systems in the aircraft braking system. That is, any one of the energy distribution systems may be configured to compensate for a reduction in energy supply to a brake, or set of brakes, associated with another energy distribution system. In this way, the aircraft braking system may maintain up to 100% braking capacity in the event of a loss of integrity in one or more of the energy distribution systems.

Optionally, the aircraft braking system comprises: an isolator operable to selectively permit or hinder a flow of energy between the first energy distribution system and the second energy distribution system.

In other words, the isolator is operable to ensure that the first energy distribution system is isolated from the second brake or to fluidly couple or permit fluid coupling of the first energy distribution system with the second brake. That is, the aircraft braking system is switchable between the first configuration and the second configuration by operating the isolator. In this way, when the braking system is in the first configuration, the isolator may be operated to couple the first energy distribution system to the second energy distribution system in the event of a reduction or loss of energy in the second energy distribution system, such as in the event of a failure of the second energy distribution system, or a component associated therewith. Optionally, the isolator is operable to permit fluid coupling of the second energy distribution system with the first brake, such as in the event of a failure of the first energy distribution system, or a component associated therewith.

Optionally, the aircraft braking system comprises a unidirectional energy flow device arranged in series with the isolator to permit energy to flow from the first energy distribution system to the second energy distribution system and to prevent a flow of energy from the second energy distribution system to the first energy distribution system. That is, the unidirectional energy flow device is configured to isolate the second energy distribution system from the first brake when the aircraft braking system is in the second configuration. This may reduce the risk of a fault in the second energy distribution system, such as an oversupply of energy, affecting the operation of the first brake when the braking system is in the second configuration. This may also reduce a risk of the a fault in the first and/or second energy distribution systems due to a loss of integrity of the isolation. For example, in the case of a hydraulic system, the unidirectional valve may prevent a loss of hydraulic fluid from the second energy distribution system in the event of a hydraulic leak associated with the isolation valve, thereby to improve the availability of the second brake.

Optionally, the aircraft braking system is a hydraulic aircraft braking system, and the isolator is a crossover valve. Optionally, the crossover valve is an electronically actuated valve, such as a solenoid valve. Optionally, the unidirectional energy flow device is a check valve. Optionally, the aircraft braking system is an electric aircraft braking system, and the isolator is an electrical isolator. Optionally, the unidirectional energy flow device is a diode, or any other device suitable for permitting a flow of electricity from the first energy distribution system to the second brake and preventing a flow of electricity in the opposite direction.

Optionally, the first and second energy distribution systems comprise respective first and second energy supplies.

The first and second energy supplies are configured to supply energy to the respective first and second brakes, or sets of brakes, via the respective first and second energy distribution systems. Each of the first and second energy distribution systems having separate respective first and second energy supplies results in fewer common components between the first and second energy distribution systems. This leads to a reduced risk of a failure of the braking system in the event of a failure of either first or the second energy supply.

Optionally, the aircraft braking system is a hydraulic aircraft braking system, and the first and second energy supplies comprise first and second hydraulic pumps. Optionally, the first and second hydraulic pumps are configured to pressurise hydraulic fluid in the respective first and second energy distribution systems. Optionally, the first and second energy supplies comprise respective first and second reservoirs. Optionally, the first and second hydraulic pumps are configured to draw hydraulic fluid from the respective first and second reservoirs. In this way, the first hydraulic pump may provide redundancy in the event of a loss of the second hydraulic fluid reservoir and/or second hydraulic pump.

Optionally, the first and second energy supplies comprise respective first and second hydraulic buffers, which are hydraulic accumulators, for managing power demand peaks. Optionally, the first and second energy supplies comprise respective first and second relief valves to prevent overpressures in the respective first and second energy distribution systems. Optionally, the first and second energy supplies comprise respective first and second filters for preventing, or limiting, contamination of the respective first and second energy supplies and/or other components of the respective first and second energy distribution systems.

Optionally, the second energy distribution system comprises a pump non-return valve, such as a check valve, downstream of the second hydraulic pump. Optionally, when the braking system is in the second configuration, the first energy distribution system is coupled to the second energy distribution system so that the pump non-return valve is located between the first energy distribution system and the hydraulic pump. Optionally, when the braking system comprises the isolator and unidirectional valve, the pump non return valve is located between the unidirectional valve and the second hydraulic pump. In this way, when the braking system is configured in the second configuration, hydraulic fluid from the first energy distribution system is unable to flow to the second hydraulic pump. This may protect the second hydraulic pump, and/or avoid a loss in braking performance when the braking system is configured in the second configuration.

Optionally, the first and second energy distribution systems are electrical energy distribution systems, and the first and second primary energy supplies are first and second electrical energy supplies. Optionally, the first and second electrical energy supplies are configured to provide electrical energy to the respective first and second energy distribution systems to operate the respective first and second brakes.

Optionally, the first energy supply has a higher maximum power output than the second energy supply.

That is, the first energy supply is configured to supply more energy per unit of time than the second energy supply. In other words, the first energy supply has a higher capacity, or rating, so that it is able to supply more power, such as hydraulic power or electrical power, than the second energy supply. Optionally, the first energy supply is configured to supply 100% of the energy required by both the first and second brakes when the aircraft braking system is configured in the second configuration. That is, the first energy supply may be oversized for the first energy distribution system, i.e. may have a greater capacity than is required to operate the first brake or first set of brakes, when the aircraft braking system is configured in the first configuration. In other words, the first energy supply may be configured to operate at a reduced capacity, such as to supply less energy per unit of time than it is capable of supplying, when the aircraft braking system is configured in the first configuration. The first reservoir may be similarly oversized. In this way, the first energy distribution system may be configured to provide energy to the first and second brakes in the second configuration without a loss in braking performance, even in the absence of the second energy supply. Moreover, the second energy supply may not be larger than it needs to be, in order to reduce a weight of the aircraft braking system.

Optionally, the aircraft braking system is operable in: a normal mode, in which the first and second energy supplies are configured to receive power from one or more primary power supplies; and a backup mode, in which the first energy supply is configured to receive power from a backup power supply.

Optionally, the first and first and second energy supplies are configured to receive power from a common primary power supply, which may be a central power supply of the aircraft, in the normal mode. Optionally, the first and second energy supplies are configured to receive power from respective first and second primary power supplies, which may be local power supplies of the aircraft. This results in improved redundancy and fewer common connections between the first and second energy supplies. As such, there is a reduced risk of a cascading failure in the aircraft braking system, such as a failure of one of the first and second energy supplies caused by a failure of the other of the first and second energy supplies.

Optionally, the backup power supply is a backup battery. Optionally, only a single backup power supply is provided, thereby to reduce a weight of the aircraft. Optionally, only the first energy supply is connectable to the backup power supply. That is, the second energy supply may not be connectable to the backup power supply. In this way, a number of common connections between the first and second energy distribution system is reduced, thereby to reduce a risk of a failure of the backup power supply caused by a failure of one of the first and second power supplies, or to reduce the risk of a cascading failure, such as a failure of one of the first and second power supplies caused by a failure of the other of the first and second power supplies.

Optionally, the aircraft braking system is a hydraulic aircraft braking system and, in the normal mode, the first and second pumps receive a direct current (DC) of electricity from the one or more primary power supplies. Optionally, in the backup mode, the first pump receives a DC from the backup power supply. Optionally, in the backup mode, the second pump is unable to receive a DC from the backup power supply. Optionally, the hydraulic aircraft braking system comprises the crossover valve, and the crossover valve is operable using power from the backup power supply.

Optionally, the aircraft braking system is operable in the backup mode in the event of a loss of power from the one or more primary power supplies to one or both of the first and second energy supplies during the normal mode.

The aircraft braking system may be operable in the backup mode of operation in the event of a failure of the one or more primary power supplies, such as in the event of a failure of one or more engines of the aircraft. Optionally, the braking system is only operable in the backup mode of operation when the aircraft braking system is in the second configuration. Optionally, the aircraft braking system is switched from the first configuration to the second configuration when the aircraft braking system is operated in the backup mode of operation, such as before, during or after the aircraft braking system begins to operate in the backup mode of operation. In this way, the backup power supply may supply power to the first energy supply, and the first energy supply may supply energy to operate the first and the second brakes, or sets of brakes, in the event of a loss of power to one or both of the first and second energy supplies. This provides the aircraft braking system with improved redundancy.

Optionally, the first and second energy distribution systems comprise respective first and second energy storage devices configured to store energy for supplying to the respective first and second brakes.

Optionally, the first and second energy storage devices are configured to receive and store energy from the respective first and second energy supplies. Optionally, the first and second energy storage devices are coupled to the respective first and second energy supplies via respective first and second charging devices. In this way, energy may flow from the first and second energy supplies to the respective first and second energy storage devices, and energy may be prevented from flowing from the first and second energy storage devices to the respective first and second energy supplies.

Optionally, when the aircraft braking system is configured in the second configuration, the second energy storage device is configured to receive and store energy from the first energy supply, such as via the isolator and unidirectional energy flow device when provided.

Optionally, the aircraft braking system is a hydraulic aircraft braking system, and the first and second energy storage devices are first and second hydraulic accumulators. Optionally, the first and second charging devices are unidirectional valves, such as check valves, and/or electronically operated valves, such as servo valves, or any other suitable valves for controlling a flow of hydraulic fluid from the first and second energy supplies to the respective first and second hydraulic accumulators.

Optionally, the aircraft braking system is an electric aircraft braking system, and the first and second energy storage devices are first and second batteries. Optionally, the first and second charging devices are switches, relays, diodes, and/or any other suitable device for controlling the flow of electrical energy from the first and second energy supplies to the respective first and second batteries.

Optionally, the first energy distribution system comprises a first normal circuit and a first alternative circuit, and the second energy distribution system comprises a second normal circuit and a second alternative circuit; wherein the first and second normal circuits are configured to couple the respective first and second energy supplies to the respective first and second brakes; and the first and second alternative circuits are configured to couple the respective first and second energy storage devices to the respective first and second brakes.

The first and second alternative circuits provide backup braking in the event of a failure of the respective first and second normal circuits, or in the event of a reduction or loss of energy supplied by the respective first and second energy supplies.

Optionally, the aircraft braking system comprises a first selector for selectively coupling the first brake to either the first normal circuit or the first alternative circuit. Optionally, the aircraft braking system comprises a second selector for selectively coupling the second brake to either the second normal circuit or the second alternative circuit. Optionally, each of the first and second normal circuits comprises first and second normal flow controllers, and the first and second alternative circuits comprise first and second alternative flow controllers, each normal and alternative flow controller configured to control a flow of energy to the respective first and second brakes, or sets of brakes. In this way, the braking system may capable of providing anti-skid braking (ABS) functions when either the normal or alternative circuits are coupled to the brakes.

Optionally, the first brake is able to be coupled to the first alternative circuit when the aircraft braking system is in the second configuration. That is, the first energy storage device may be coupled to the first brake, such as in the event of a failure of the first normal circuit, while the first energy storage device is coupled to the second brake. In this way, there may be little to no loss in braking performance in the second configuration, even in cases where the first energy supply is the same size as the second energy supply.

Optionally, the aircraft braking system is a hydraulic aircraft braking system, and the first and second selectors are first and second valves, such as shuttle valves. Optionally, the first and second normal flow controllers are valves, such as servo valves. Optionally, the first and second alternative flow controllers are valves, such as direct drive valves.

Optionally, the aircraft braking system is an electric aircraft braking system, and the first and second selectors are switches. Optionally, each of the first and second normal and alternative flow controllers is any suitable electronic metering device. Optionally, each of the first and second alternative flow controllers is a switch. Optionally, in an electric aircraft braking system, neither of the first and second normal and alternative flow controllers are present.

Optionally, the first energy distribution system comprises a first energy distribution component, and the second energy distribution system comprises a second energy distribution component corresponding to the first energy distribution component; and the first energy distribution component is dissimilar to the second energy distribution component.

The first and second energy distribution components may perform similar functions in the respective first and second energy distribution systems. Providing dissimilar first and second energy distribution components may reduce a risk of a common-mode failure in the aircraft braking system on the basis of a fault in one of the first and second energy distribution components, such as a common manufacturing defect.

Optionally, the first and second energy distribution components are first and second flow control devices for controlling a flow of energy to the respective first and second brakes. Optionally, the first and second flow control devices are: the first and second charging devices; the first and second selectors; the first and second normal flow controllers; the first and second alternative flow controllers; or any other flow control devices in the first and second energy distribution systems.

A second aspect of the present invention provides a method of controlling an aircraft braking system of an aircraft, the aircraft comprising first and second brakes, and the aircraft braking system comprising first and second energy distribution systems for delivering energy to the first and second brakes to operate the respective first and second brakes, wherein the method comprises: configuring the aircraft braking system in a first configuration, in which the first energy distribution system is coupled to the first brake and is isolated from the second brake, and the second energy distribution system is coupled to the second brake and is isolated from the first brake; and configuring the aircraft braking system in a second configuration, in which the first energy distribution system is coupled to both the first and second brakes.

Optionally, the aircraft braking system is the aircraft braking system of the first aspect. That is, the aircraft braking system may comprise any of the optional features associated with the first aspect.

Optionally, when the braking system is configured in the first configuration, the method comprises determining whether there has been a reduction or loss of energy in the second energy distribution system, and configuring the aircraft braking system in the second configuration in response to a positive determination that there has been a reduction or loss of energy in the second energy distribution system. The reduction or loss of energy may be due to a failure of a part of the second energy distribution system and/or components associated therewith.

Optionally, the aircraft braking system comprises the isolator, and the method comprises operating the isolator to configure the aircraft braking system in the second configuration.

Optionally, the aircraft braking system comprises the first and second energy supplies, and when the aircraft braking system is configured in the first configuration, the method comprises causing the first and second energy supplies to supply energy to the respective first and second brakes, or sets of brakes, via the respective first and second energy distribution systems.

Optionally, the method comprises causing the first energy supply to deliver more energy per unit of time when the aircraft braking system is in the second configuration than when the aircraft braking system is in the first configuration.

Optionally, the method comprises causing the aircraft braking system to operate in: a normal mode, wherein the first and second energy supplies are configured to receive power from one or more primary power supplies.

Optionally, the method comprises operating the aircraft braking system in a backup mode, wherein the first energy supply is configured to receive power from a backup power supply, in the event of a loss of power from the one or more primary power supplies to one or both of the first and second energy supplies during the normal mode. Optionally, the method comprises operating the aircraft braking system in the backup mode in the event of a failure of the one or more power supplies. Optionally, the method comprises reconfiguring the aircraft braking system from the first configuration to the second configuration when the aircraft braking system is operated in the backup mode of operation.

Optionally, the aircraft braking system comprises the first and second energy storage devices, and the method comprises, when the aircraft braking system is in the first configuration, causing energy from the first and second energy supplies to be stored in the respective first and second energy storage devices. Optionally, when the aircraft braking system is in the second configuration, the method comprises causing energy from the first energy supply to be stored in the second energy storage device.

Optionally, the braking system comprise the first and second normal and alternative circuits. Optionally, the method comprises selectively coupling the first brake, or set of brakes, to either the first normal circuit or the first alternative circuit. Optionally, the method comprises coupling the second brake, or set of brakes, to either the second normal circuit or the first alternative circuit. Optionally, the method comprises coupling the first and second brakes to the respective first and second alternative circuits in the event of a reduction or loss of energy in the respective first or second normal circuit, such as in the event of a failure of the respective first or second normal circuit or a component associated therewith.

A third aspect of the present invention provides an aircraft braking system controller for controlling the aircraft braking system of the first aspect; wherein the aircraft braking system controller is configured to: detect a reduction or a loss of energy in the second energy distribution system when the aircraft braking system is configured in the first configuration; and cause the aircraft braking system to switch to the second configuration in response to a loss or reduction of energy in the second energy distribution system.

The loss or reduction of energy in the second energy distribution system may be caused by a failure of the second energy distribution system, or a component associated therewith, such as the second energy supply, when one is provided. Optionally, the aircraft braking control system is configured to cause operation of the isolator, when one is provided, in response to the loss or reduction of energy in the second energy distribution system.

Optionally, the aircraft braking system controller comprises a primary avionics system configured to control the aircraft braking system, and a secondary avionics system configured to control the aircraft braking system in the event of a failure of the primary avionics system, wherein the hardware and software of the primary avionics system are dissimilar to the hardware and software of the secondary avionics system.

This may reduce a risk of a common mode failure, such as due to a manufacturing and/or programming defect, in the primary and secondary avionics systems, thereby improving availability and safety. This may also reduce a requirement for additional avionics systems, thereby reducing weight, initial cost and maintenance costs.

Optionally, the braking system controller is configured to control the braking system in accordance with the method of the second aspect. The optional features of the method of the second aspect similarly apply to the braking system controller.

Optionally, the aircraft braking system of the first aspect comprises the aircraft braking system controller of the third aspect.

A fourth aspect of the present invention provides an aircraft comprising: the aircraft braking system of the first aspect or the aircraft braking system controller of the third aspect; and the first and second brakes.

Optionally, the aircraft comprises first and second wheels, and the first and second brakes are for braking the first and second wheels. Optionally, the aircraft comprises a first landing gear, and the first and second wheels and first and second brakes are located on the first landing gear. Optionally, the aircraft comprises a second landing gear, and the first wheel and the first brake are each located on the first landing gear, and the second wheel and the second brake are each located on the second landing gear. Optionally, the aircraft comprises a fuselage and the first and second landing gears are located on opposite lateral sides of the fuselage.

A fifth aspect of the present invention provides an aircraft braking system for an aircraft, the aircraft comprising plural sets of brakes, each comprising at least one brake, the aircraft braking system comprising plural braking subsystems configured to provide energy for operating the or each brake in the respective plural sets of brakes; wherein at least one of the braking subsystems is operable to provide energy for braking the or each brake associated with at least one of the other braking subsystems.

While the first aspect of the present invention is directed to an aircraft system which is an aircraft braking system, a sixth aspect is directed to an aircraft system that is other than an aircraft braking system. That is, the sixth aspect provides an aircraft system that is the same as the aircraft braking system of the first aspect, except that instead of being coupled to brakes of the aircraft, the first and second energy distribution systems of the aircraft system are coupled to other actuatable components of the aircraft. For example, the aircraft may comprise first and second spoilers, and the first and second energy distribution systems may be coupled to the first and second spoilers, respectively. It will be understood that the first and second spoilers may be any other actuatable aircraft component, such as flaps, ailerons and/or landing gear doors. The system of the sixth aspect may comprise any of the optional features of the first aspect. The aircraft of the fourth aspect may comprise the aircraft system of the sixth aspect.

BRIEF DESCRIPTION OF THE DRAWINGS

Embodiments of the invention will now be described, by way of example only, with reference to the accompanying drawings, in which.

DETAILED DESCRIPTION

It will be understood that the terms "energy" and "flow" may herein refer to "hydraulic" energy, such as in the form of pressurised hydraulic fluid, or "electric" energy, such as in the form of an electric current, flowing through a system. Similarly, the terms "fluidly coupled" or "fluidically coupled" are interchangeable and herein refer to a coupling of elements to permit a flow of energy from one element to another, such as in the form of pressurised hydraulic fluid or electrical energy, depending on the context in which the terms are used. As such, a "flow control device" may herein refer to a device suitable for controlling a flow of energy through the system, such as a hydraulic valve in the case of a hydraulic flow control device, or, in the case of an electric flow control device, an electric isolator, junction, relay, resistor, diode or any other suitable device suitable for controlling a flow of an electric current.

Figure 1:
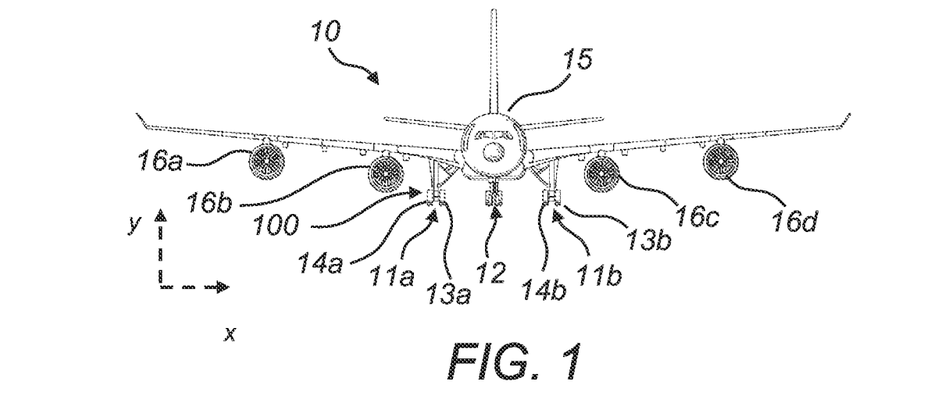
FIG. 1 shows a schematic view of an aircraft in accordance with an embodiment of the invention.

FIG. 1 shows an example aircraft 10 comprising first and second main landing gears 11a, 11b and a nose landing gear 12. The first and second main landing gears 11a, 11b of the aircraft 10 comprise respective first and second sets of wheels 13a, 13b and respective first and second sets of brakes 14a, 14b for braking the respective sets wheels 13a, 13b. In the illustrated example, each set of wheels 13a, 13b comprises two wheels and each respective set of brakes 14a, 14b comprises a respective two brakes, though, in some examples, each set of wheels 13a, 13b and respective brakes 14a, 14b comprises any number of wheels and respective brakes, such as one, four, up to six, up to ten, or up to twenty wheels and respective brakes. The aircraft also comprises four engines 16a-d for providing propulsion to the aircraft. Each engine 16a-d comprises a generator (not shown) for generating power for use by aircraft 10 systems, such as the aircraft braking system 100 introduced and described hereinafter.

Each brake in each of the first and second sets of brakes 14a, 14b is configured to brake a respective wheel in the respective first and second sets of wheels 13a, 13b during a landing or taxiing manoeuvre, such as to slow or stop the aircraft 10, or during flight of the aircraft 10, such as during a pre-landing braking system test or shortly after take-off. The brakes 14 are disc brakes comprising a disc and a calliper (not shown) for exerting a friction force on the disc when the calliper is forced against the disc, such as by an actuator. Specifically, the brakes in each set of brakes 14a, 14b are multiple-disc brakes. That is, each brake in the first and second sets of brakes 14a, 14b comprises multiple callipers and multiple discs. In some examples, each brake in the first and second sets of brakes 14a, 14b is a carbon disc brake or a steel brake. In some examples, each brake in the first and second sets of brakes is any other suitable disc brake known in the art, such as a single-disc brake, or any other suitable type of aircraft brake. The nose landing gear 12 does not comprise any brake, though in some examples, one or more wheels of the nose landing gear 12 are braked by respective brakes (not shown). The aircraft 10 comprises a fuselage 15, and the first and second main landing gears 11a, 11b are located on opposite sides of the fuselage 15.

Figure 2:
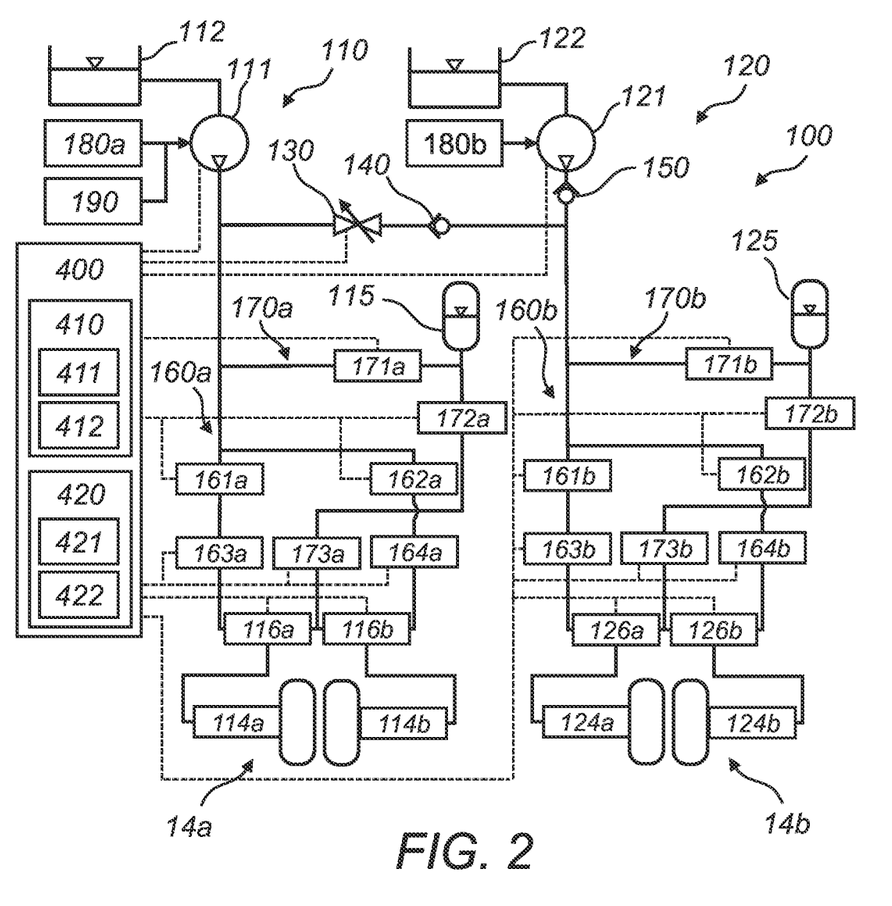
FIG. 2 shows a schematic representation of an aircraft braking system of the aircraft shown in FIG. 1.

The aircraft 10 comprises an aircraft braking system 100, as best shown schematically in FIG. 2. The aircraft braking system 100 described herein is a hydraulic braking system, though the aircraft braking system 100 may, in some examples, be an electric braking system as described below. The aircraft braking system 100 comprises an aircraft braking system controller 400 for controlling the aircraft braking system 100. In some examples, the aircraft braking system controller 400 is separate from the aircraft braking system 100. The aircraft braking system controller 400 will be described in further detail hereinafter. In the present example, the aircraft braking system comprises the first and second sets of brakes 14a, 14b, though in other examples, the first and second sets of brakes 14a, 14b are a part of the aircraft 10 and not the aircraft braking system 100. That is, in some examples, the aircraft braking system 100 is connectable to the first and second sets of brakes 14a, 14b and is configured to deliver pressurised hydraulic fluid to the first and second sets of brakes 14a, 14b in use.

The aircraft braking system 100 comprises a first hydraulic distribution system 110 and a second hydraulic distribution system 120. In the illustrated example, each of the first and second sets of brakes comprises respective left 114a, 124a and right 114b, 124b brakes, though as noted above each set of brakes 14a, 14b may comprise any number of brakes 114a-b, 124a-b. The first and second hydraulic distribution systems 110, 120 are coupled to the brakes 114a-b, 124a-b in the respective first and second sets of brakes 14a, 14b, thereby to deliver energy in the form of pressurised hydraulic fluid to the each brake 114a-b, 124a-b in the respective first and second sets of brakes 14a, 14b. Specifically, each brake 114a-b, 124a-b comprises an actuator (not shown) configured to be actuated by pressurised hydraulic fluid, and the first and second hydraulic distribution systems are configured to deliver pressurised hydraulic fluid to operate the respective actuators, thereby to operate the brakes. As such, each hydraulic distribution system 110, 120 is understood to be an energy distribution system, wherein energy is distributed by the first and second hydraulic distribution systems 110, 120 in the form of pressurised hydraulic fluid.

The first and second hydraulic distribution systems 110, 120 comprise respective first and second hydraulic pumps 111, 121, which are configured to supply pressurised hydraulic fluid to the respective first and second sets of brakes 14a, 14b via the respective first and second hydraulic distribution systems 110, 120. As such, the first and second hydraulic pumps 111, 121 may be referred to herein as first and second "energy supplies" 111, 121. The first and second hydraulic pumps 111, 121 are coupled to respective first and second reservoirs 112, 122. The first and second reservoirs 112, 122 are configured to store hydraulic fluid, and the first and second hydraulic pumps 111, 121 are configured to draw hydraulic fluid from the respective first and second reservoirs 112, 122 and to pressurise the hydraulic fluid for distribution by the respective first and second hydraulic distribution systems 110, 120. Though not shown in FIG. 2, the first and second hydraulic distribution systems 110, 120 are closed systems, for example so that hydraulic fluid present in the first and second hydraulic distribution systems 110, 120 can bypass the respective first and second hydraulic pumps 111, 121 to be delivered back to the respective first and second reservoirs 112 122, such as following a braking event, or in the event of an overpressure in the respective hydraulic distribution systems 110, 120.

Although not shown in FIG. 2 for brevity, the first and second hydraulic distribution systems 110, 120 comprise respective first and second hydraulic buffers, respective first and second relief valves, and respective first and second filters. The first and second hydraulic buffers are hydraulic accumulators located downstream of the respective first and second hydraulic pumps 111, 121 for managing peaks in power demand from the respective first and second hydraulic pumps 111, 121. The first and second relief valves are similarly located downstream of the respective first and second hydraulic pumps 111, 121, and are for preventing overpressures in the respective first and second energy distribution systems 110, 120. The first and second filters are located upstream of the respective first and second hydraulic pumps 111, 121, and are for preventing, or limiting, contamination of the respective first and second hydraulic pumps 111, 121 and/or other components of the respective first and second energy distribution systems 110, 120 with any contaminants which may be present in the hydraulic fluid of the aircraft braking system 100.

The aircraft braking system 100 comprises a crossover valve 130 and a first check valve 140 in series connecting the first hydraulic distribution system 110 to the second hydraulic distribution system 120. Specifically, the crossover valve 130 is operable to selectively configure the crossover valve 130 in either a closed position, to fluidically isolate the first and second hydraulic distribution systems 110, 120 from each other, or an open position, to fluidically couple the first hydraulic distribution system 110 to the second hydraulic distribution system 120. The check valve 140 is configured to permit hydraulic fluid to flow from the first hydraulic distribution system 110 to the second hydraulic distribution system 120, when the crossover valve 140 is in the open position, but to hinder or prevent a flow of hydraulic fluid from the second hydraulic distribution system to the first hydraulic distribution system.

That is, the braking system 100 is switchable between: a first configuration, wherein the crossover valve 130 is in the closed position so that the first hydraulic distribution system 110 is fluidically isolated from the second set of brakes 14b and the second hydraulic distribution system 120 is fluidically isolated from the first set of brakes 14a; and a second configuration, in which the first hydraulic distribution system 110 is fluidically coupled to both the first and second sets of brakes 14a, 14b. In other words, when the braking system 100 is configured in the first configuration, the first and second hydraulic pumps 111, 112 are configured to deliver energy in the form of pressurised hydraulic fluid to the respective first and second sets of brakes 14a, 14b, and in the second configuration, the first hydraulic pump 111 is configured to deliver energy in the form of pressurised hydraulic fluid to both first and second sets of brakes 14a, 14b.

The crossover valve 130 may be referred to herein as an "isolator", while the check valve 140 may be referred to herein as a "unidirectional flow control device", where the "flow" controlled by the check valve is a flow of energy, in this case in the form of pressurised hydraulic fluid.

The aircraft braking system 100 comprises a second check valve 150 downstream from the second hydraulic pump 121. The second check valve 150 is configured to permit hydraulic fluid to flow from the second hydraulic pump 121 towards the second set of brakes 14b, and to hinder or prevent hydraulic fluid flowing towards the second hydraulic pump 121, such as from the first hydraulic distribution system 110 when the braking system 100 is configured in the second configuration. In some examples, the first and second check valves 140, 150 are replaced by a single valve. In some examples, the crossover valve 130 and the first and second check valves 140, 150 are replaced by a single selector valve configured to permit hydraulic fluid to flow towards the second set of brakes 14b via the second energy distribution system 120 from either the second hydraulic pump 121 or the first hydraulic distribution system 110, such as from the first hydraulic pump 111.

In the illustrated example, the first hydraulic pump 111 has a higher maximum power output than the second hydraulic pump 112. In other words, the first hydraulic pump 111 has a higher output capacity, or rating, than the second hydraulic pump 112. That is, the first hydraulic pump 111 is sized to supply more energy per unit of time, i.e. more hydraulic power, than the second hydraulic pump 112. Specifically, the first hydraulic pump 111 is configured to supply 100% of the pressurised hydraulic fluid required to fully operate both the first and second sets of brakes 14a, 14b when the aircraft braking system 100 is configured in the second configuration. In other examples, the first energy supply is configured to supply up to 75%, up to 85%, up to 95%, or up to 100% of the pressurised hydraulic fluid required to fully operate both the first and second sets of brakes 14a, 14b when the aircraft braking system is configured in the second configuration. In some examples, the first and second hydraulic pumps 111, 121 have the same maximum power output. That is, in some examples, the first energy supply is configured to supply up to 50% of the pressurised hydraulic fluid required to fully operate both the first and second sets of brakes 14a, 14b when the aircraft braking system is configured in the second configuration. This may reduce a weight of the aircraft braking system while ensuring energy is distributed more evenly to the first and second sets of brakes 14a, 14b, thereby providing more symmetrical braking of the aircraft.

In other words, the first hydraulic pump 111 is oversized for the first energy distribution system 110, meaning that the first hydraulic pump 111 has a greater capacity than is required to operate the first set of brakes 14a when the aircraft braking system 100 is configured in the first configuration.

In the present example, the first hydraulic pump 111 is configured to operate at a reduced capacity, such as to supply less pressurised hydraulic fluid per unit of time than it is capable of supplying, when aircraft braking system 100 is configured in the first configuration. The first reservoir 112 is similarly oversized, such as to accommodate a sufficient amount of hydraulic fluid for supplying to both the first and second hydraulic distribution systems. Specifically, the first reservoir 112 is sized to accommodate 18 litres fluid volume of hydraulic fluid, while the second reservoir 122 is sized to accommodate 12 litres fluid volume hydraulic fluid, though in other examples the first and second reservoirs 112, 122 are any suitable size. The first reservoir 112 need not be double the size of the second reservoir 122, at least because each of the first and second hydraulic distribution systems 110, 120 comprises a respective first and second storage device 115, 125, as will be described in further detail hereinafter. Specifically, the first reservoir 112 need not be sized provide hydraulic fluid for charging the second energy storage device 125, as this is normally provided by the second reservoir 122 when the braking system 100 is in the first configuration. As such, the first reservoir need only be sized to accommodate a sufficient volume of hydraulic fluid for supplying to the first energy distribution system 110, which includes the first energy storage device 115, and a part of the second energy distribution system 120, which excludes the second energy storage device 125. In the present example, the first and second storage devices 115, 125 each have a capacity of 6 l, though in other examples the first and second storage devices may have any other suitable capacity.

In the present example, each of the brakes 114a-b, 124a-b of the aircraft 10 requires a supply of hydraulic fluid of ten l/min, the first hydraulic pump 111 is sized to supply pressurised hydraulic fluid at a pressure of 200 bar and a rate of forty l/min, and the second hydraulic pump 121 is sized to supply pressurised hydraulic fluid at a pressure of 200 bar and a rate of twenty l/min. It will be understood that these figures are provided by way of example only, and that, in other examples, the first and second hydraulic pumps 111, 121 may have any other suitable capacity, which may depend on multiple factors such as the number and size of brakes they are intended to serve.

The aircraft braking system 100 comprises first and second primary power supplies 180a-b configured to supply power to the respective first and second hydraulic pumps 111, 121. The first and second primary power supplies 180a-b in the illustrated example are configured to deliver power from separate respective power sources (not shown), such as local power sources or power generators aboard the aircraft 10. In some examples, each primary power supply 180a-b is configured to supply power generated by a respective one or more engines 16a-d of the aircraft 10. In some examples, the first and second primary power supplies 180a-b are configured to supply power from the same power source, which may be a centralised power source or power generator of the aircraft 10.

The braking system comprises a backup power supply 190 configured to supply power to the first hydraulic pump 111 and not the second hydraulic pump 121. That is, only the first hydraulic pump 111 is connected to the backup power supply 190 and the second hydraulic pump 121 is not connected to the backup power supply 190. The backup power supply 190 is a backup battery 190, though in other examples the backup power supply 190 is any other suitable energy storage device or power generating device.

In other words, the aircraft braking system 100 is operable in a normal mode, wherein the first and second hydraulic pumps 111, 121 are configured to receive power from the respective first and second primary power supplies 180a-b, and a backup mode, wherein the first hydraulic pump 111 is configured to receive power from the backup power supply 190. That is, in the normal mode, the first and second hydraulic pumps 111, 121 receive a direct current (DC) of electricity from the respective first and second power supplies 180a-b, and in the backup mode, the first hydraulic pump 111 receives a DC from the backup power supply 190.

The first and second hydraulic distribution systems 110, 120 comprise respective first and second hydraulic accumulators 115, 125, more generally referred to herein as "energy storage devices", configured to store energy in the form of pressurised hydraulic fluid for supplying to the respective first and second sets of brakes 14a, 14b. The first and second hydraulic accumulators 115, 125 are configured to receive and store energy from the respective first and second energy supplies 111, 121. The first and second hydraulic accumulators are coupled to the respective first and second energy supplies via respective first and second refill valves 171a, 171b. The first and second refill valves 171a, 171b may be referred to herein more generally as "charging devices". The first and second refill valves 171a, 171b are selector valves operable to selectively couple the first and second hydraulic pumps 111, 121 to the respective first and second hydraulic accumulators 115, 125 to charge the respective first and second hydraulic accumulators 115, 125. In some examples, the first and second refill valves 171a, 171b comprise, or are instead, check valves, so that hydraulic fluid can flow from the first and second hydraulic pumps 111, 121 to the respective first and second hydraulic accumulators 115, 125, but not from the first and second hydraulic accumulators to the respective first and second hydraulic pumps 111, 121.

The first hydraulic distribution system 110 comprises a first normal circuit 160a and a first alternative circuit 170a, and the second hydraulic distribution system 120 comprises a second normal circuit 160b and a second alternative circuit 170b. The first and second normal circuits 160a, 160b are configured to couple the respective first and second energy supplies 111, 121 to the respective first and second sets of brakes 14a, 14b. The first and second alternative circuits 170a, 170b are configured to couple the respective first and second hydraulic accumulators 115, 125 to the respective first and second sets of brakes 14a, 14b.

The aircraft braking system 100 comprises first left and right shuttle valves 116a-b associated with the respective first left and right brakes 114a-b, and second left and right shuttle valves 126a-b associated with the respective second left and right brakes 124a-b. The first left and right shuttle valves 116a-b are operable to selectively couple the respective first left and right brakes 114a-b to either the first normal circuit 160a or the first alternative circuit 170a. Similarly, the second left and right shuttle valves 126a-b are configured to selectively couple the respective second left and right brakes 124a-b to either the second normal circuit 160b or the second alternative circuit 170b. In this way, the first and/or second alternative circuits 170a-b can be coupled to the respective first and/or second sets of brakes 14a, 14b in the event of a loss of integrity of the respective first and/or second normal circuits 160a-b, such as in the event of a burst pipe or a faulty component of the respective first and/or second normal circuits 160a-b. The first and second left and right shuttle valves 116a-b, 126a-b are operable using hydraulic pressure in the respective first and second normal and alternative circuits 160a-b, 170a-b. For example, a higher hydraulic pressure in the first normal circuit 160a than the first alternative circuit 170a causes the first left and right shuttle valves 116a-b to permit a flow of hydraulic fluid from the first normal circuit 160 to the respective first left and right brakes 114a-b, and to prevent or hinder a flow of hydraulic fluid from the first alternative circuit 170a to the respective first left and right brakes 114a-b. In some examples, the first and second left and right shuttle valves 116a-b, 126a-b are any suitable valves, such as selector valves.

By way of example, the first alternative circuit 170a can be coupled to the first set of brakes when the aircraft braking system 100 is in the second configuration. That is, the first hydraulic accumulator 115 can be coupled to the first set of brakes 14a, such as in the event of a failure of the first normal circuit 160a, while the crossover valve 130 is in the open position, such that the first hydraulic pump 111 is coupled to the second set of brakes 14b. In this way, there may be little to no loss in braking performance when the braking system is in the second configuration, even in examples where the first hydraulic pump 111 is the same size as the second hydraulic pump 121.

The first normal circuit 160a comprises first left and right normal selector valves 161a, 162a configured in series with respective first left and right normal servo valves 163a, 164a to connect the first hydraulic pump 111 to the respective first left and right brakes 114a-b via the respective first left and right shuttle valves 116a-b. The first left and right normal selector valves 161a, 162a and the respective first left and right normal servo valves 163a, 164a are operable to selectively permit or prevent a flow of hydraulic fluid from the first hydraulic pump 111 to the respective first left and right brakes 114a-b. Specifically, in the present example, the first left and right normal selector valves 161a, 162a are operable, such as by the aircraft braking system controller 400 as described hereinafter, to "authorise" operation of the respective first left and right brakes 114a-b. In other words, either the first left or right normal selector valves 161a, 162a may be closed to prevent operation of the respective first left or right brake 114a-b by fluid delivered via the first normal circuit 160a. The first left and right normal servo valves 163a, 164a are operable to "control" operation of the respective first left and right brakes 114a-b, such as to meter an amount of fluid delivered to the first left and right brakes 114a-b via the first normal circuit. In this way, the first left and right normal servo valves 163a, 164a are operable, such as by the aircraft braking system controller 400 as described hereinafter, to vary the amount of braking provided by the respective first left and right brakes 114a-b, such as in response to a pilot input or automatic braking input, and/or to provide anti-skid braking functions.

In a similar way to the first normal circuit 160a, the second normal circuit 160b comprises second normal left and right selector valves 161b, 162b configured in series with respective second normal left and right servo valves 163b, 164b to connect the second hydraulic pump 121 to the respective second left and right brakes 124a-b via the respective second left and right shuttle valves 126a-b. The second left and right normal selector valves 161b, 162b and second left and right normal servo valves 163b, 164b are operable in a similar way to the corresponding first left and right normal selector valves 161b, 162b and first left and right normal servo valves 163b, 164b, specifically to authorise and control braking, respectively, of the second left and right brakes 124a, 124b using fluid delivered via the second normal circuit 160b.

The first alternative circuit 170a comprises a first alternative selector valve 172a arranged in series with a first alternative direct drive valve 173a to connect the first hydraulic pump 111 to the first left and right brakes 114a-b via the respective first left and right shuttle valves 116a-b. Similarly, the second alternative circuit 170b comprises a second alternative selector valve 172b arranged in series with a second alternative direct drive valve 173b to connect the second hydraulic pump 121 to the second left and right brakes 124a-b via the respective second left and right shuttle valves 126a-b. The first and second alternative selector valves 172a-b are operable in a similar way to the first and second normal left and right selector valves 161a, 162a to authorise braking of the respective first and second sets of brakes 14a, 14b using hydraulic fluid from the respective first and second alternative circuits 170a-b. Likewise, first and second direct drive valves 173a-b are operable in similar way to the first and second normal left and right servo valves 163a, 164a to control braking of the respective first and second sets of brakes 14a, 14b using hydraulic fluid from the respective first and second alternative circuits 170a-b.

Providing a single alternative selector valve and a single direct drive in each of the first and second alternative circuits 170a, 170b reduces a weight of each of the first and second alternative circuits 170a, 170b. It will be understood, however, that in some examples, the first and second alternative circuits 170a, 170b may each comprise left and right alternative selector valves (not shown) and/or respective left and right direct drive valves (not shown) corresponding to respective left and right brakes 114a-b, 124a-b of each of the first and second alternative circuits 170a, 170b. This may improve a performance of the first and second alternative circuits 170a, 170b.

Any one of the described valves, by which is meant any one of the selector valves 161a-b, 162a-b, 172a-b, servo valves 163a-b, 164a-b, direct drive valves 173a-b and/or shuttle valves 116a-b, 126a-b of the illustrated aircraft braking system 100, may be considered an "energy distribution component". In some examples, any one of the described valves, or energy distribution components, is instead any other suitable type of valve. Each of the described valves is an electrically operated valve, such as a solenoid valve, and is operated by the aircraft braking system controller 400 as described in more detail hereinafter. In other examples, any one of the described valves is operable in any other suitable way.

In some examples, any one of the described valves may not be present or may be combined with any other of the described valves. By way of example only, the first left and right normal selector valves 161a, 162a may be a single combined selector valve (not shown) for authorising braking of both the first left and right brakes 114a-b. It will be understood, however, that providing separate first left and right normal selector valves 161a, 162a, as in the illustrated example, improves availability of braking and minimises performance losses, so that the left brake can be operated by hydraulic fluid delivered via the first normal circuit 160a even in the event of a failure of the first right normal selector valve 162a or other component associated therewith, for example. Moreover, providing separate first left and right normal selector valves 161a, 162a and separate first left and right normal servo valves 163a, 164a helps to prevent a single hydraulic failure in the first normal circuit 160a from causing un-commanded braking of both of the first left and right brakes 114a-b, for example during take-off of the aircraft 10.

In the illustrated example, the first left and right normal selector valves 161a, 162a are dissimilar to the second left and right normal selector valves 161b, 162b. Similarly, the first left and right normal servo valves are dissimilar to the second left and right normal servo valves. The dissimilar valves may be valves of a different type, a different quality, and/or valves from a different manufacturer. This provides a reduced risk of a common mode failure of the dissimilar valves, such as due to a manufacturing defect. In a similar way, although they perform a similar function, the first and second direct drive valves 173a, 173b of the respective first and second alternative circuits 170a, 170b are dissimilar to the each of the respective first and second left and right servo valves 163a, 164a. It will be understood that, in other examples, any one of the described valves of the aircraft braking system 100 may be similar or dissimilar to any one of the other valves in the aircraft braking system 100.

As noted hereinbefore, the aircraft braking system 100 comprises an aircraft braking system controller 400 for controlling the aircraft braking system 100. Specifically, the aircraft braking system controller 400 is configured to cause operation of the valves of the aircraft braking system 100 described hereinbefore, such as to cause operation of the brakes 114a-b, 124a-b of the aircraft 10. That is, the aircraft braking system controller 400 is communicatively and/or electrically coupled to each of the valves and hydraulic pumps 111, 121 of the aircraft braking system 100 in order to perform the various functions described hereinbefore, such as to operate the first and second left and right servo valves 163a-b, 164a-b to operate the respective brakes 114a-b, 124a-b and provide anti-skid braking functions, and/or to operate the first and second left and right normal selector valves 161a-b, 162a-b to authorise braking of the respective brakes 114a-b, 124a-b, and so on.

The aircraft braking system comprises a plurality of pressure transducers (not shown) arranged to sense hydraulic pressure in various parts of the aircraft braking system 100, such as adjacent one or more of the valves of the braking system 100. The pressure transducers are communicatively coupled to the aircraft braking control system 400. In this way, the aircraft braking control system 400 is configured to operate the valves of the aircraft braking system 100 as described hereinbefore on the basis of the pressures sensed by the respective pressure transducers. For example, the braking control system 100 comprises pressure transducers associated with each of the first and second left and right servo valves 163a-b, 164a-b, and the aircraft braking system controller 400 is configured to operate the first and second left and right servo valves 163a-b, 164a-b on the basis of the pressures sensed by the respective pressure transducers. In another example, the controller is configured to operate the first and second left and right shuttle valves 116a-b, 126a-b in response to a drop in pressure in the respective first and second normal circuits. In other words, in some examples, the aircraft braking system controller 400 is configured to provide closed-loop control of any one or more of the valves of the braking system 100.

More specifically, in the illustrated example, the aircraft braking system controller 400 is configured to detect a reduction or a loss of pressure in the second hydraulic distribution system 120, such as using one or more pressure transducers in the second hydraulic distribution system 120, when the braking system is configured in the first configuration, i.e. when the crossover valve 130 is closed. The aircraft braking system controller 400 is configured to cause the aircraft braking system 100 to switch to the second configuration, specifically by causing operation of the crossover valve 130 to open the crossover valve 130, in response to the loss or reduction of hydraulic pressure in the second energy distribution system 120 detected by the aircraft braking system controller 400. The loss or reduction of hydraulic pressure may be due to a failure of a part of the second hydraulic distribution system 120, such as a failure of the second hydraulic pump 121 or components associated therewith.

In some examples, the aircraft braking system 100 comprises any number of hydraulic distribution systems 110, 120. For example, though not shown in the Figures, the aircraft braking system 100 may comprise a first hydraulic distribution system configured to supply hydraulic fluid to the first left brake 114a, a second hydraulic distribution system configured to supply hydraulic fluid the first right brake 114b, a third hydraulic distribution system configured to supply hydraulic fluid to the second left brake 124a, and a fourth hydraulic distribution system configured to supply hydraulic fluid to the second right brake 124b. In some examples, one or more of the first to fourth hydraulic distribution systems is connectable to any other of the first to fourth hydraulic distribution systems, such as using a crossover valve and a unidirectional valve as described with reference to FIG. 2. In other examples, there aircraft 10 comprises any number of brakes and any number of hydraulic distribution systems for delivering hydraulic fluid to the associated brakes.

In the illustrated example, the aircraft braking control system 400 comprises a primary avionics system 410 configured to control the aircraft braking system 100 as described hereinbefore, and a secondary avionics system 420 configured to control the aircraft braking system in the event of a failure of the primary avionics system. The hardware and software of the primary avionics system 410 are dissimilar to the hardware and software of the secondary avionics system 420. This may provide improved redundancy and a reduced risk of a common mode failure of the aircraft braking system controller 400.

In some examples, the primary and secondary avionics systems 410 comprise respective primary and secondary command modules 411, 421 and respective primary and secondary monitoring modules 412, 422. The primary and secondary command modules 411, 421 are configured to issue signals to cause operation of the operable components, such as valves, of the braking control system 100. The primary and secondary monitoring modules 412, 422 are configured to monitor the signals issued by respective primary and secondary command modules 411, 421, to monitor the operation of the operable components, such as valves, of the braking control system 100. The primary and second monitoring modules 412, 422 are configured to interrupt signals issued by the respective primary and secondary command modules 411, 421 on detection of a discrepancy between the issued signals and the operation of the operable components in response to the signals, such as to correct the signals or to prevent the signals from reaching the operable components. This may improve performance and reliability of the braking control system 100.

Figure 3:
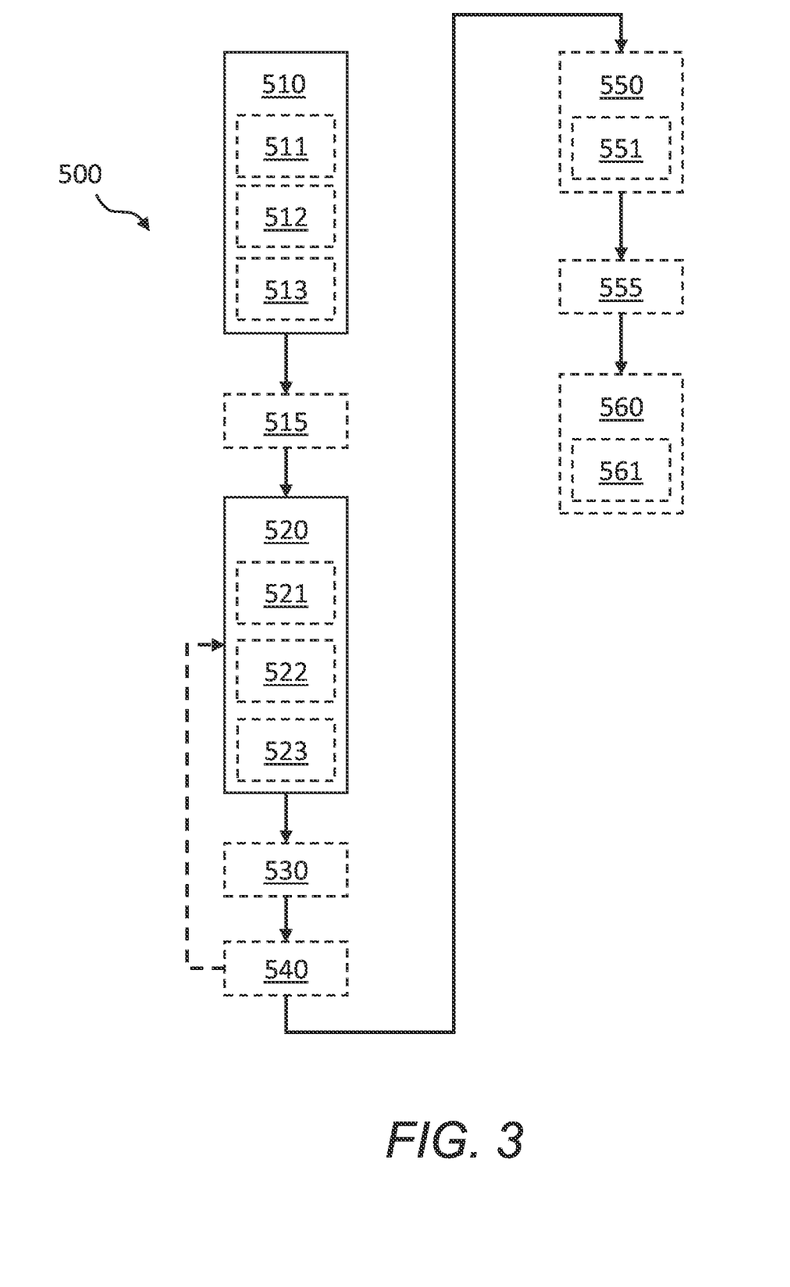
FIG. 3 shows a flow chart illustrating a method of operating the braking system of FIG. 2.

FIG. 3 shows an example method 500 of controlling the aircraft braking system 100. The method 500 comprises configuring 510 the aircraft braking system 100 in the first configuration, such as by causing 511 the crossover valve 130 to be configured in the closed position, and configuring 520 the aircraft braking system 100 in the second configuration, such as by causing 521 the crossover valve 130 to be configured in the open position. Optionally, when the aircraft braking system 100 is configured in the first configuration, the method 500 comprises determining 515 whether there has been a reduction or loss of energy in the second energy distribution system 120, and configuring 520 the aircraft in the second configuration in response to a positive determination of a reduction or loss of energy in the second energy distribution system 120. Optionally, when the aircraft braking system 100 is configured in the first configuration, the method 500 comprises causing 512 the first and second energy supplies to supply energy to the respective first and second sets of brakes 14a, 14b via the respective first and second energy distribution systems 110, 120.

Optionally, the method comprises causing 522 the first hydraulic pump 111 to deliver more energy per unit of time when the aircraft braking system 100 is in the second configuration than when the aircraft braking system 100 is in the first configuration. Optionally, the method 500 comprises causing 530 the aircraft braking system 100 to operate in the normal mode. Optionally, the method comprises causing 540 the aircraft braking system 100 to operate in the backup mode in the event of a loss of power to one or both of the first and second hydraulic pumps 111, 121 during the normal mode.

Optionally, the method comprises configuring 520 the aircraft braking system 100 in the second configuration when the aircraft braking system 100 is caused 540 to operate in the backup mode. That is, as shown by the dashed arrow in FIG. 3, in some examples the causing 540 the aircraft braking system 100 to operate in the backup mode is followed by the configuring 520 the aircraft braking system 100 in the second configuration. In other examples, the configuring 520 the aircraft braking system 100 in the second configuration occurs before, or at the same time as the causing 540 the aircraft braking system 100 to operate in the backup mode.

Optionally, when the aircraft braking system 100 is in the first configuration, the method comprises causing 513 pressurised hydraulic fluid supplied by the first and second hydraulic pumps 111, 121 to be stored in the respective first and second energy storage devices 115, 125, such as by opening the respective first and second refill valves 171a, 171b. Optionally, when the aircraft braking system is in the second configuration, the method comprises causing 523 pressurised hydraulic fluid from the first hydraulic pump 111 to be stored in the second energy storage device 125.

Optionally, the method 500 comprises coupling 550 the first or second sets of brakes 14a, 14b to the respective first or second normal circuits 160a-b, such as by causing 551 operation of the respective first or second left and right shuttle valves 116a-b, 126a-b as described hereinbefore. Optionally, the method comprises coupling 560 the first or second sets of brakes 14a, 14b to the respective first or second alternative circuits 170a-b, such as by causing 561 operation of the respective first or second left and right shuttle valves 116a-b, 126a-b, as described hereinbefore. Optionally, the method comprises determining 555 whether there has been a reduction or loss of energy in the respective first or second normal circuits 160a, 160b, and, in the event of a positive determination, coupling 560 the first or second sets of brakes 14a, 14b to the respective first or second alternative circuits 170a-b.

Unless otherwise indicated above, any one of the method 500 integers described with reference to FIG. 3 may be performed before, after or during any other of the method 500 integers. By way of non-limiting example, the coupling 550 the first or second sets of brakes 14a, 14b to the respective first or second normal circuits 160a-b may occur before, during or after the causing 540 the braking system 100 to operate in the backup mode, which in turn may be before, during or after the configuring 520 the aircraft braking system 100 in the second configuration. In some examples, the aircraft braking system controller 400 is configured to operate the aircraft braking system 100 in accordance with the method 500 described with reference to FIG. 3.

It will be understood that, although the above description describes the aircraft braking system 100 as a hydraulic aircraft braking system 100, in other examples the aircraft braking system 100 is instead an electric braking system 100. In such examples, the components of the hydraulic braking system 100 described hereinbefore may instead be substituted for equivalent electrical or electronic components. In some examples, the first and second hydraulic pumps 111, 121 are instead first and second electric energy supplies 111, 121, such as first and second wires, generators or batteries. In some examples, the valves of the braking system are instead any suitable electronic switching and/or metering devices. In some examples, the crossover valve 130 is an electronic isolator. In some examples, the first and second hydraulic distribution systems 110, 120 are instead any suitable first and second electric distribution systems 110, 120 for passing electrical energy from the respective first and second electric energy supplies 111, 121 to the respective first and second sets of brakes 14a, 14b.

It will be further understood that, while the above examples are described in relation to an aircraft system which is an aircraft braking system 100, in some examples, the aircraft system is other than an aircraft braking system 100. In some examples, the aircraft system is the same as the aircraft braking system 100 described above, except that instead of being coupled to the sets of brakes 14a, 14b of the aircraft 10, the first and second energy distribution systems of the aircraft system are coupled to other actuatable components of the aircraft. In some examples, the aircraft 10 comprises first and second spoilers, and the first and second energy distribution systems are coupled to the first and second spoilers, respectively. It will be understood that in some examples the first and second spoilers are any other actuatable aircraft component, such as flaps, ailerons and/or landing gear doors.

It is to be noted that the term "or" as used herein is to be interpreted to mean "and/or", unless expressly stated otherwise.

The invention is:

1. An aircraft braking system for an aircraft including first and second brakes, the aircraft braking system comprising:
   a first energy distribution system and a second energy distribution system configured to deliver energy to the first and second brakes to operate the respective first and second brakes,
   an isolator configured to selectively permit or hinder a flow of hydraulic fluid from the first energy distribution system to the second energy distribution system, and
   an unidirectional energy flow device in series with the isolator and configured to permit hydraulic fluid to flow from the first energy distribution system to the second energy distribution system and to prevent a flow of hydraulic fluid from the second energy distribution system to the first energy distribution system,
   wherein the aircraft braking system is switchable between:
      a first configuration in which the first energy distribution system is coupled to the first brake and is isolated from the second brake, and the second energy distribution system is coupled to the second brake and is isolated from the first brake; and
      a second configuration in which the first energy distribution system is coupled to both the first and second brakes,
   wherein the first energy distribution system includes a first hydraulic pump and a first reservoir, and the second energy distribution system includes a second hydraulic pump and a second reservoir separate from the first reservoir,
   wherein a first maximum power output of the first hydraulic pump is greater than a second maximum power output of the second hydraulic pump,
   wherein the first hydraulic pump is adapted to operate up to the first maximum power output to pump hydraulic fluid to the first and second brakes while the aircraft braking system is in the second configuration, and
   wherein the second hydraulic pump is adapted to operate up to the second maximum power output to supply hydraulic fluid to the second brake while the aircraft braking system is in the first configuration.

2. The aircraft braking system of claim 1, wherein the aircraft braking system is operable in:
   a normal mode in which the first and second hydraulic pumps are configured to receive power from one or more primary power supplies; and
   a backup mode in which the first hydraulic pump is configured to receive power from a backup power supply.

3. The aircraft braking system of claim 2, wherein the aircraft braking system is operable in the backup mode in response to a loss of power from the one or more primary power supplies to one or both of the first and second hydraulic pumps during the normal mode.

4. The aircraft braking system of claim 1, wherein the first energy distribution system comprises a first flow control device, and the second energy distribution system comprises a second flow control device.

5. An aircraft braking system controller for controlling the aircraft braking system of claim 1, wherein the aircraft braking system controller is configured to:
   detect a reduction or a loss of energy in the second energy distribution system when the braking system is configured in the first configuration; and
   cause the aircraft braking system to switch to the second configuration on the basis of a loss or reduction of energy in the second energy distribution system detected by the aircraft braking system controller.

6. The aircraft braking system controller according to claim 5, comprising a primary avionics system configured to control the aircraft braking system, and a secondary avionics system configured to control the aircraft braking system in the event of a failure of the primary avionics system.

7. An aircraft comprising:
   the aircraft braking system of claim 1, and
   the first and second brake.

8. The aircraft braking system of claim 1, wherein the first and second energy distribution systems comprise respective first and second energy storage devices configured to store energy for supplying to the respective first and second brakes.

9. The aircraft braking system of claim 8, wherein, when the aircraft braking system is configured in the second configuration, the second energy storage device is configured to receive and store energy from the first energy supply.

10. An aircraft braking system for an aircraft including first and second brakes, the aircraft braking system comprising:
   a first energy distribution system and a second energy distribution system configured to deliver energy to the first and second brakes to operate the respective first and second brakes,
   wherein the aircraft braking system is switchable between:

a first configuration in which the first energy distribution system is coupled to the first brake and is isolated from the second brake, and the second energy distribution system is coupled to the second brake and is isolated from the first brake, and a second configuration in which the first energy distribution system is coupled to both the first and second brakes, wherein the first energy distribution system includes a first hydraulic pump and a first hydraulic fluid reservoir, and the second energy distribution system includes a second hydraulic pump and a second hydraulic fluid reservoir separate from the first reservoir, wherein a first maximum power output of the first hydraulic pump is greater than a second maximum power output of the second hydraulic pump, wherein the first hydraulic pump is adapted to operate up to the first maximum power output to pump hydraulic fluid to the first and second brakes while the aircraft braking system is in the second configuration, wherein the second hydraulic pump is adapted to operate up to the second maximum power output to supply hydraulic fluid to the second brake while the aircraft braking system is in the first configuration, wherein the first energy distribution system comprises a first normal circuit and a first alternative circuit, and the second energy distribution system comprises a second normal circuit and a second alternative circuit;

wherein the first and second normal circuits are configured to couple the respective first and second hydraulic pumps to the respective first and second brakes; and wherein the first and second alternative circuits are configured to receive hydraulic fluid from the respective first and second hydraulic fluid reservoirs and supply hydraulic fluid to the respective first and second brakes.

11. The aircraft braking system of claim 10, wherein:
the first reservoir has a first capacity to store hydraulic fluid sufficient to supply the first hydraulic pump operating at the first maximum power output,
the second reservoir has a second capacity to store hydraulic fluid sufficient to supply the second hydraulic pump operating at the second maximum power output, and
the first capacity is greater than the second capacity.

12. An aircraft braking system for an aircraft including first and second brakes, the aircraft braking system comprising:
a first energy distribution system and a second energy distribution system configured to deliver energy to the first and second brakes to operate the respective first and second brakes,
wherein the aircraft braking system is switchable between:
a first configuration in which the first energy distribution system is coupled to the first brake and is isolated from the second brake, and the second energy distribution system is coupled to the second brake and is isolated from the first brake, and
a second configuration in which the first energy distribution system is coupled to both the first and second brakes,
wherein the first energy distribution system includes a first hydraulic pump and a first reservoir, and the second energy distribution system includes a second hydraulic pump and a second reservoir separate from the first reservoir,
wherein a first maximum power output of the first hydraulic pump is greater than a second maximum power output of the second hydraulic pump,
wherein the first hydraulic pump is adapted to operate up to the first maximum power output to pump hydraulic fluid to the first and second brakes while the aircraft braking system is in the second configuration, and
wherein the second hydraulic pump is adapted to operate up to the second maximum power output to supply hydraulic fluid to the second brake while the aircraft braking system is in the first configuration,
wherein:
the first reservoir has a first capacity to store hydraulic fluid sufficient to supply the first hydraulic pump operating at the first maximum power output,
the second reservoir has a second capacity to store hydraulic fluid sufficient to supply the second hydraulic pump operating at the second maximum power output and insufficient to supply hydraulic fluid to the first hydraulic pump operating at the first maximum power output, and
wherein the first capacity is greater than the second capacity.

* * * * *